(12) United States Patent
Kim et al.

(10) Patent No.: US 8,508,554 B2
(45) Date of Patent: Aug. 13, 2013

(54) DISPLAY DEVICE AND DRIVING METHOD THEREOF

(75) Inventors: Jung-Won Kim, Seoul (KR);
Bong-Hyun You, Yongin-si (KR);
Jun-Pyo Lee, Cheonan-si (KR)

(73) Assignee: Samsung Display Co., Ltd. (KR)

(*) Notice: Subject to any disclaimer, the term of this patent is extended or adjusted under 35 U.S.C. 154(b) by 661 days.

(21) Appl. No.: 12/499,386

(22) Filed: Jul. 8, 2009

(65) Prior Publication Data
US 2010/0123739 A1    May 20, 2010

(30) Foreign Application Priority Data

Nov. 18, 2008   (KR) .................. 10-2008-0114772

(51) Int. Cl.
*G09G 5/10* (2006.01)
*G09G 3/36* (2006.01)

(52) U.S. Cl.
USPC ............................................. 345/690; 345/89

(58) Field of Classification Search
None
See application file for complete search history.

(56) References Cited

U.S. PATENT DOCUMENTS

| | | | | |
|---|---|---|---|---|
| 4,677,483 A * | 6/1987 | Dischert et al. | ................ | 348/448 |
| 4,891,701 A * | 1/1990 | Shikina et al. | ................ | 348/451 |
| 2003/0006952 A1* | 1/2003 | Hong | ............................. | 345/89 |
| 2003/0146893 A1* | 8/2003 | Sawabe | ......................... | 345/89 |
| 2004/0252764 A1* | 12/2004 | Hur et al. | ................ | 375/240.16 |
| 2005/0141617 A1* | 6/2005 | Kim et al. | ................ | 375/240.21 |
| 2006/0001605 A1* | 1/2006 | Furutani | ......................... | 345/63 |
| 2006/0092441 A1* | 5/2006 | Quan et al. | ..................... | 358/1.9 |
| 2006/0125812 A1* | 6/2006 | Lee | ............................. | 345/204 |
| 2006/0279786 A1* | 12/2006 | Park et al. | ...................... | 358/2.1 |
| 2007/0091115 A1* | 4/2007 | Takada et al. | ................. | 345/603 |
| 2007/0132866 A1* | 6/2007 | Lee et al. | ..................... | 348/254 |
| 2007/0147510 A1* | 6/2007 | Asad et al. | ................ | 375/240.18 |
| 2007/0171163 A1* | 7/2007 | Miyata | ............................. | 345/87 |
| 2008/0291326 A1* | 11/2008 | Shishido et al. | .............. | 348/555 |
| 2008/0297676 A1* | 12/2008 | Kimura | ............................. | 349/39 |
| 2008/0309600 A1* | 12/2008 | Lee et al. | ........................ | 345/89 |
| 2009/0278869 A1* | 11/2009 | Oishi et al. | ..................... | 345/691 |
| 2011/0090264 A1* | 4/2011 | Tatsumi | ......................... | 345/690 |

FOREIGN PATENT DOCUMENTS

| | | |
|---|---|---|
| KR | 1020050086357 | 8/2005 |
| KR | 1020060066424 | 6/2006 |
| KR | 1020080011854 | 2/2008 |
| KR | 1020080028178 | 3/2008 |

* cited by examiner

*Primary Examiner* — Amare Mengistu
*Assistant Examiner* — Antonio Xavier
(74) *Attorney, Agent, or Firm* — Cantor Colburn LLP

(57) ABSTRACT

A display device and a driving method thereof are provided. The display device includes an image signal processor that is supplied with original image signals for various frames and generates interpolation signals used to display images corresponding to interpolation frames, and a display panel that displays images corresponding to the respective various frames and images corresponding to the respective interpolation frames, wherein the images displayed in the respective frames are images corresponding to a first gamma curve corrected based on an original gamma curve, the images displayed in the respective interpolation frames are images corresponding to a second gamma curve corrected based on the original gamma curve, and the first gamma curve is different from the second gamma curve.

22 Claims, 9 Drawing Sheets

DISPLAY DEVICE AND DRIVING METHOD THEREOF

This application claims priority to Korean Patent Application No. 10-2008-0114772, filed on Nov. 18, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device and driving method thereof, and more particularly, to a display device which displays an image having improved display quality, and a driving method thereof.

2. Description of the Related Art

A liquid crystal display ("LCD") includes a liquid crystal panel including a first panel having pixel electrodes, a second panel having a common electrode, and a liquid crystal layer interposed therebetween.

The display quality of an LCD is affected by a response speed of liquid crystal molecules within the liquid crystal layer. In this regard, the response speed of liquid crystal molecules is demanded. To this end, various driving methods of correcting an image signal of a current frame by comparing the image signal of the current frame with an image signal of a previous frame have been proposed.

Meanwhile, in order to improve the display quality of an LCD, development is underway to provide insertion of an interpolation frame, in which movement of the same object is corrected, between original frames. For example, an LCD receives image information corresponding to frames of 60 sequences per second and displays an image representing image information corresponding to 120 frames per second.

BRIEF SUMMARY OF THE INVENTION

The present invention provides a display device which displays an image having improved display quality.

The present invention also provides a driving method of a display device which displays an image having improved display quality.

In so doing, the present invention provides a liquid crystal display ("LCD") capable of improving the response speed of liquid crystal molecules while improving display quality by correcting an image signal having frequency which can be varied.

The above and other features of the present invention will be described in or be apparent from the following description of the exemplary embodiments.

According to an exemplary embodiment of the present invention, there is provided a display device including an image signal processor that is supplied with original image signals for various frames and generates interpolation signals used to display images corresponding to interpolation frames, and a display panel that displays images corresponding to the respective various frames and images corresponding to the respective interpolation frames, wherein the images displayed in the respective frames are images corresponding to a first gamma curve corrected based on an original gamma curve, the images displayed in the respective interpolation frames are images corresponding to a second gamma curve corrected based on the original gamma curve, and the first gamma curve is different from the second gamma curve.

According to another exemplary embodiment of the present invention, there is provided a display device including an image signal processor that is supplied with original image signals for various frames and outputs a first image signal for the respective frames and a second image signal for an interpolation frame inserted between a previous frame and a current frame among the respective frames, a data driver that provides a data signal based on the first signal or the second image signal, and a display panel that displays an image in response to the data signal, wherein the first image signal is a signal obtained by correcting levels of the original image signals and the second image signal is a signal obtained by correcting a level of the interpolation signal generated using the first image signal for the previous frame and the current frame.

According to still another exemplary embodiment of the present invention, there is provided a method of driving a display device, the method including receiving original image signals for a previous frame and a current frame and generating an interpolation signal used to display an image corresponding to each interpolation frame, displaying images corresponding to a first gamma curve corrected based on an original gamma curve in the respective frames, and displaying images corresponding to a second gamma curve corrected based on the original gamma curve in the interpolation frame, wherein the first gamma curve is different from the second gamma curve.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
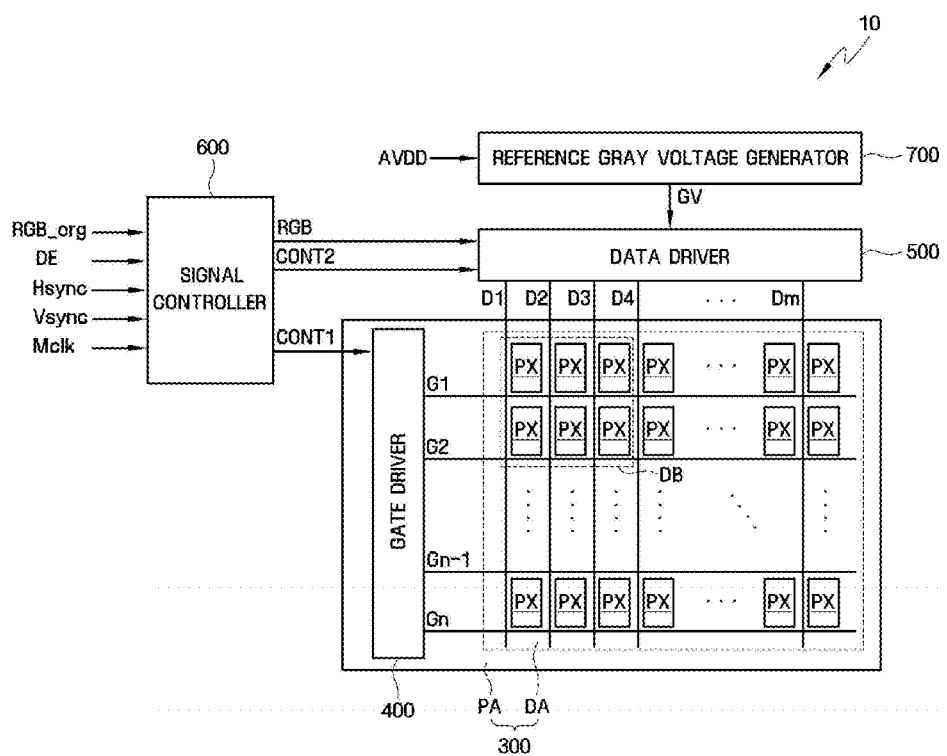
FIG. 1 is a block diagram of an exemplary display device according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a display device according to an exemplary embodiment of the present invention will be described with reference to FIGS. 1 through 8. FIG. 1 is a block diagram of an exemplary display device according to an exemplary embodiment of the present invention, FIG. 2 is an equivalent circuit diagram of an exemplary pixel (PX) shown in FIG. 1, and FIG. 3 is a block diagram of an exemplary signal controller shown in FIG. 1.

Figure 2:
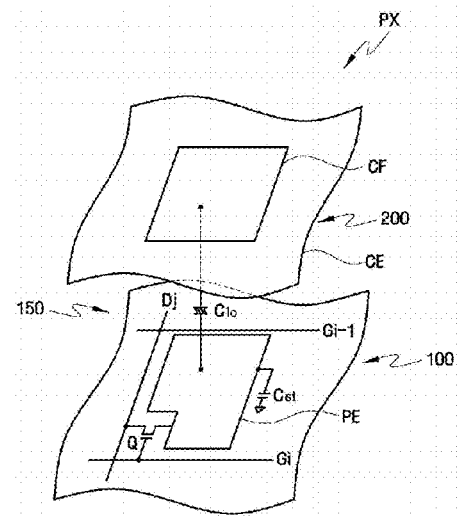
FIG. 2 is an equivalent circuit diagram of an exemplary pixel (PX) shown in FIG. 1.
Figure 3:
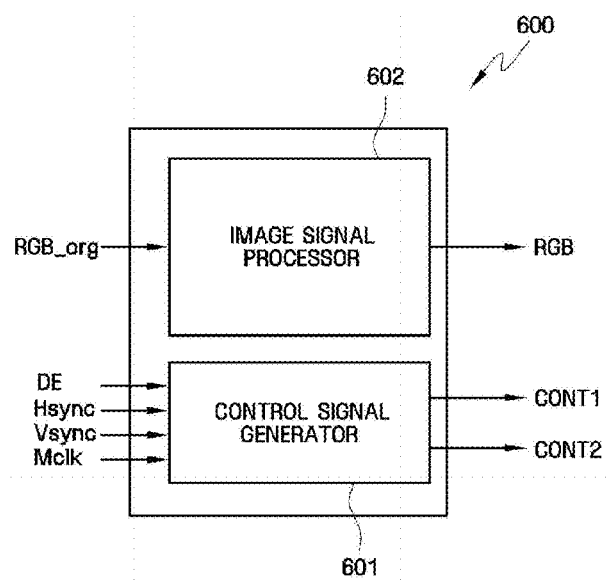
FIG. 3 is a block diagram of an exemplary signal controller shown in FIG. 1.

Referring to FIGS. 1 through 3, the display device 10 according to an exemplary embodiment of the present invention includes a display panel 300, a signal controller 600, a gate driver 400, a data driver 500, and a reference gray voltage generator 700.

The display panel 300 includes a plurality of gate lines G1-Gn, a plurality of data lines D1-Dm, and a plurality of pixels PX. The display panel 300 includes a display area DA displaying an image and a peripheral area PA adjacent to the display area, where no image is displayed.

With reference to FIG. 2, the display area DA of the display panel 300 shown in FIG. 1 is an area on which an image is displayed, including a first substrate or first panel 100 having a plurality of gate lines G1-Gn (where n is an integer greater than 2), a plurality of data lines D1-Dm (where m is an integer greater than 2), switching elements Q and pixel electrodes PE, a second substrate or second panel 200 having color filters CF and a common electrode CE, and a liquid crystal layer 150 interposed between the first and second substrates 100, 200. The gate lines G1-Gn extend substantially in a row direction, a first direction, to be parallel to each other, and the data lines D1-Dm extend substantially in a column direction, a second direction, to be parallel to each other. The first direction may be substantially perpendicular to the second direction. The PA, which surrounds the DA, is a portion that is not used to display images, for example, because the first panel 100 is wider than the second panel 200.

Each pixel, for example, a pixel PX shown in FIG. 1, will be described. Referring to FIG. 2, each pixel PX includes a color filter CF in a region of the second panel 200 corresponding to a pixel electrode PE of the first panel 100. For example, the pixel PX connected to the i-th gate line Gi (where i=1~n) and the j-th data line Dj (where j=1~m), includes a switching element Q that is connected to the signal lines Gi and Dj and a liquid crystal capacitor Clc and a storage capacitor Cst that are connected to the switching element Q. In an exemplary embodiment, the storage capacitor Cst may be omitted, if necessary. The switching element Q is an amorphous silicon thin film transistor ("a-Si TFT").

The signal controller 600 is supplied from an external graphic controller (not shown) with an original image signal RGB_org and input control signals controlling the display of the original image signal RGB_org, and supplies an image signal RGB, a gate control signal CONT1, and a data control signal CONT2. As shown in FIG. 3, the signal controller 600 includes a control signal generator 601 and an image signal processor 602.

The control signal generator 601 receives the input control signals, including a vertical synchronization signal Vsync, a horizontal synchronization signal Hsync, a main clock Mclk, a data enable signal DE, etc. and generates the gate control signal CONT1 and the data control signal CONT2. Here, the gate control signal CONT1 is supplied to the gate driver 400 to initiate the operation of the gate driver 400, and control an output time or a pulse width of the gate-on voltage Von. The data control signal CONT2 is supplied to the data driver 500 for starting the operation of the data driver 500 and controlling an output time of a data signal.

The image signal processor 602 supplies the image signal RGB generated based on the original image signal RGB_org. The image signal RGB may include a first image signal RGB_1 for each of two adjacent frames, i.e., a previous frame and a current frame, and a second image signal RGB_2 for an interpolation frame inserted between the two adjacent frames. Here, each frame may refer to a displayed image corresponding to the original image signal RGB_org or its display time, and each interpolation frame may refer to a displayed image corresponding to the interpolation signal RGB_ip generated by the image signal processor 602 or its display time.

In detail, the image signal processor 602 supplies the first image signal RGB_1, which is obtained by correcting a level of the original image signal RGB_org in each frame, a corrected image corresponding to a first gamma curve (for example, a curve labeled 'b' shown in FIG. 7A), which is based on an original gamma curve (for example, a curve labeled 'a' shown in FIG. 7A), is displayed on the display panel 300. The image signal processor 602 supplies the second image signal RGB_2, which is obtained by correcting a level of the interpolation signal RGB_ip in the interpolation frame, a corrected image corresponding to a second gamma curve (for example, a curve labeled 'c' shown in FIG. 7A), which is based on the original gamma curve (for example, the curve labeled 'a' shown in FIG. 7A), is displayed on the display panel 300. Here, an original image corresponding to the uncorrected, original image signal RGB_org may be an image corresponding to the original gamma curve (for example, the curve labeled 'a' shown in FIG. 7A). The level of the original image signal RGB_org or the interpolation signal RGB_ip may be a gray of digital signal.

Accordingly, the display device 10 according to an exemplary embodiment of the present invention can improve lateral visibility and reduce a motion blur. In addition, display deterioration due to an artifact image caused to a miscalculated interpolation frame can be reduced. The image signal processor 602 will be described in further detail with reference to FIGS. 4 and 5.

The gate driver 400 receives a gate control signal CONT1 and a gate-off voltage Voff, and sequentially applies gate signals to the plurality of gate lines G1-Gn. As shown in FIG. 1, the gate driver 400 is formed on the PA of the display panel 300 to then be connected to the display panel 300, but not limited thereto. However, the gate driver 400 may include at least one integrated circuit ("IC") chip mounted on the display panel 300 as a tape carrier package ("TCP") type, but not limited thereto. According to another exemplary embodiment, the gate driver 400 may be constituted by a first gate driver and a second gate driver and disposed at opposing sides of the display panel 300.

The reference gray voltage generator 700 generates a reference gray voltage GV using a driving voltage AVDD and a look-up table derived from the original gamma curve. In detail, the reference gray voltage GV supplied from the reference gray voltage generator 700 according to an exemplary embodiment of the present invention may include various voltages having different levels of the image signal RGB used to represent images corresponding to the original gamma curve. The reference gray voltage generator 700 may generate multiple voltages having different levels using a voltage divider having a number of serially connected resistors, but not limited thereto. The internal circuit of the reference gray voltage generator 700 can be implemented in various manners.

The data driver 500 is supplied with the reference gray voltage GV, an image signal RGB and the data control signal CONT2, and applies data signals corresponding to the image signal RGB to the respective data lines D1-Dm. In detail, the data driver 500 supplies the first image signal RGB_1 and the data signal generated based on the reference gray voltage GV to the respective data lines D1-Dm in each frame, and supplies the second image signal RGB_2 and the data signal generated based on the reference gray voltage GV to the respective data lines D1-Dm in the interpolation frame. The data driver 500 may include at least one integrated circuit ("IC") chip mounted on the display panel 300 as a tape carrier package ("TCP") type, which is attached to the display panel 300, but not limited thereto. According to another exemplary embodiment, the data driver 500 may be formed within or otherwise disposed on the PA of the display panel 300.

Hereinafter, the image signal processor 602 shown in FIG. 3 will be described in more detail with reference to FIGS. 4 and 5.

Figure 4:
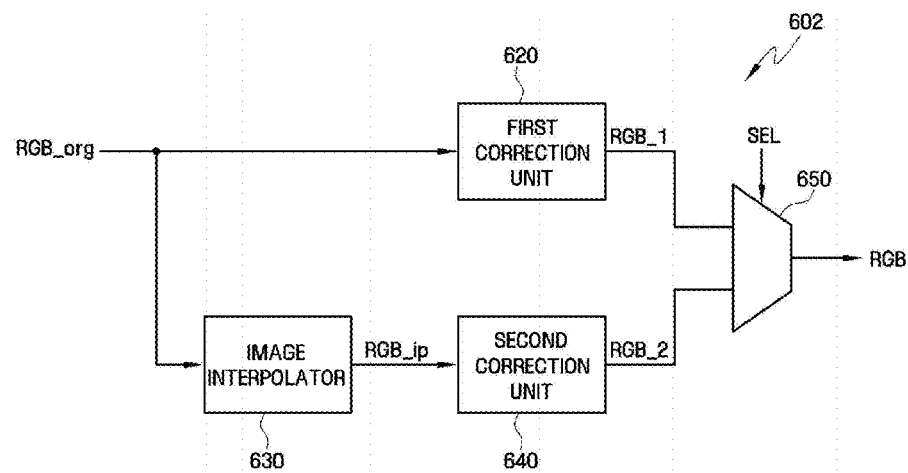
FIG. 4 is a block diagram of an exemplary image signal processor shown in FIG. 3.
Figure 5:
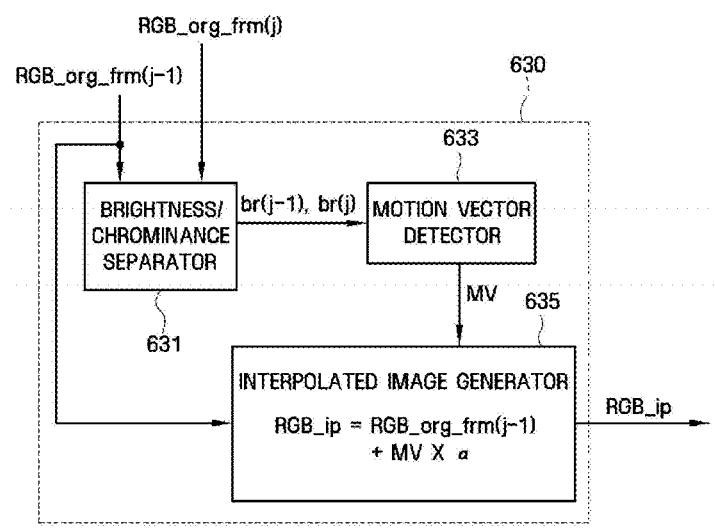
FIG. 5 is a block diagram of an exemplary image interpolator shown in FIG. 4.

FIG. 4 is a block diagram of an exemplary image signal processor shown in FIG. 3, and FIG. 5 is a block diagram of an exemplary image interpolator shown in FIG. 4.

Referring to FIGS. 4 and 5, the image signal processor 602 receives an original image signal RGB_org and generates an image signal RGB including a first image signal RGB_1 and a second image signal RGB_2. In detail, the image signal processor 602 is supplied with the original image signal RGB_org corresponding to an original image of each frame, and outputs the first image signal RGB_1 used to display an image corresponding to each of two adjacent frames and the second image signal RGB_2 used to display an image corresponding to an interpolation frame inserted between the two adjacent frames. Here, since the image signal RGB includes the first image signal RGB_1 obtained by correcting the level of the original image signal RGB_org, and the second image signal RGB_2 obtained by correcting the level of the interpolation signal RGB_ip generated based on the original image signal RGB_org, the image signal RGB may have a higher frequency, for example, 2 k Hz, than the original image signal RGB_org, for example, 1 k Hz. The image signal processor 602 may include a first correction unit 620, an image interpolator 630, a second correction unit 640, and a selector 650, as shown in FIG. 4.

The first correction unit 620 receives the original image signal RGB_org, corrects the level of the original image signal RGB_org, and outputs the first image signal RGB_1 for each frame. In detail, in an exemplary embodiment, the first correction unit 620 receives the original image signal RGB_org and provides a corrected signal as the first image signal RGB_1 having a higher level than the original image signal RGB_org. In an alternative exemplary embodiment, however, the first correction unit 620 may provide a corrected signal as the first image signal RGB_1 having a lower level than the original image signal RGB_org.

Accordingly, the display device 10 can display an image corresponding to the first gamma curve corrected based on the original gamma curve in the respective frames. In other words, since a data signal having a relatively high gamma voltage is applied to the data lines D1-Dm, an image having higher brightness than an image corresponding to the original image signal RGB_org can be displayed.

The first correction unit 620 can change the level of the original image signal RGB_org using a first look-up table containing corrected data, e.g., a value corresponding to the original image signal RGB_org. In detail, the first correction unit 620 receives the original image signal RGB_org, corrects the level of the original image signal RGB_org based on the corrected data supplied from the first look-up table, and outputs the first image signal RGB_1. Here, the first look-up table may be stored in a memory provided inside or outside the first correction unit 620.

The image interpolator 630 generates an interpolation signal RGB_ip used to generate an image corresponding to the interpolation frame using original image signals RGB_org of the previous frame and the current frame. The interpolation frame is inserted between original frames to then be subjected to motion compensation, thereby improving the display quality of the display device 10. As shown in FIG. 5, the image interpolator 630 includes a brightness/chrominance separator 631, a motion vector detector 633 and an interpolated image generator 635.

The brightness/chrominance separator 631 separates an original image signal RGB_org_frm(j−1) of the previous frame and an original image signal RGB_org_frm(j) of the current frame into brightness components br(j−1) and br(j) and chrominance components. In detail, the brightness/chrominance separator 631 is supplied with the original image signal RGB_org_frm(j) of the current frame and the original image signal RGB_org_frm(j−1) of the previous frame from an external graphics controller (not shown) and a frame memory (not shown), respectively, and separates the respective original image signals RGB_org_frm(j−1) and RGB_org_frm(j) into the brightness components br(j−1) and br(j) and the chrominance components. Here, the brightness components br(j−1) and br(j) of the original image signal RGB_org may contain information about brightness and the chrominance components may contain information about colors.

The motion vector detector 633 compares the previous frame frm(j−1) and the current frame frm(j) and calculates motion vectors MV of the same object. Here, the motion vectors MV may be a physical quantity representing motion of an object contained in an image. The motion vector detector 633, which is supplied with the original image signal RGB_org_frm(j) for the current frame and the original image signal RGB_org_frm(j−1) for the previous frame, obtains the motion vectors MV of the object using the original image signals RGB_org_frm(j−1) and RGB_org_frm(j). In an exemplary embodiment, the motion vector detector 633 receives the brightness components br(j−1) and br(j) and chrominance components of the respective original image signals RGB_org frm(j−1) and RGB_org frm(j).

The interpolated image generator 635 generates the interpolation signal RGB_ip using the original image signal RGB_org_frm(j−1) of the previous frame supplied from the frame memory, the motion vector MV obtained from the motion vector detector 633, and a predetermined weight α. In detail, the interpolated image generator 635 generates the interpolation signal RGB_ip using the original image signal RGB_org_frm(j−1) of the previous frame by allocating the predetermined weight α to the motion vector Mv, that is, MV×α, such that RGB_ip=RGB_org_frm(j−1)+MV×α. Accordingly, the interpolated image generator 635 can generate the interpolation signal RGB_ip representing an image by which a position of the object contained in the image of the previous frame frm(j−1) is estimated.

The second correction unit 640 receives the interpolation signal RGB_ip from the image interpolator 630, corrects the level of the interpolation signal RGB_ip, and outputs the second image signal RGB_2 for the interpolation frame frm (ip). In detail, in an exemplary embodiment, the second correction unit 640 receives the interpolation signal RGB_ip from the image interpolator 630, corrects to a signal having a lower level than the interpolation signal RGB_ip, and provides the second image signal RGB_2. In an alternative exemplary embodiment, however, the second correction unit 640 may provide a corrected signal as the second image signal RGB_2 having a higher level than the interpolation signal RGB_ip.

The selector 650 selectively outputs the first image signal RGB_1 or the second image signal RGB_2. In detail, the selector 650 is supplied the first and second image signals RGB_1 and RGB_2 from the first and second correction units 620 and 640, respectively, and selectively outputs the first image signal RGB_1 or the second image signal RGB_2 in response to a selection signal SEL as the image signal RGB. Here, the selection signal SEL may be generated from the control signal generator 601. Referring to FIG. 4, an example of the selector 650 includes, but not limited thereto, a multiplexer MUX, and may be implemented as another device in another exemplary embodiment of the present invention.

Hereinafter, an exemplary operation of the display device according to an exemplary embodiment of the present invention will be described with reference to FIGS. 1 through 8.

Figure 6:
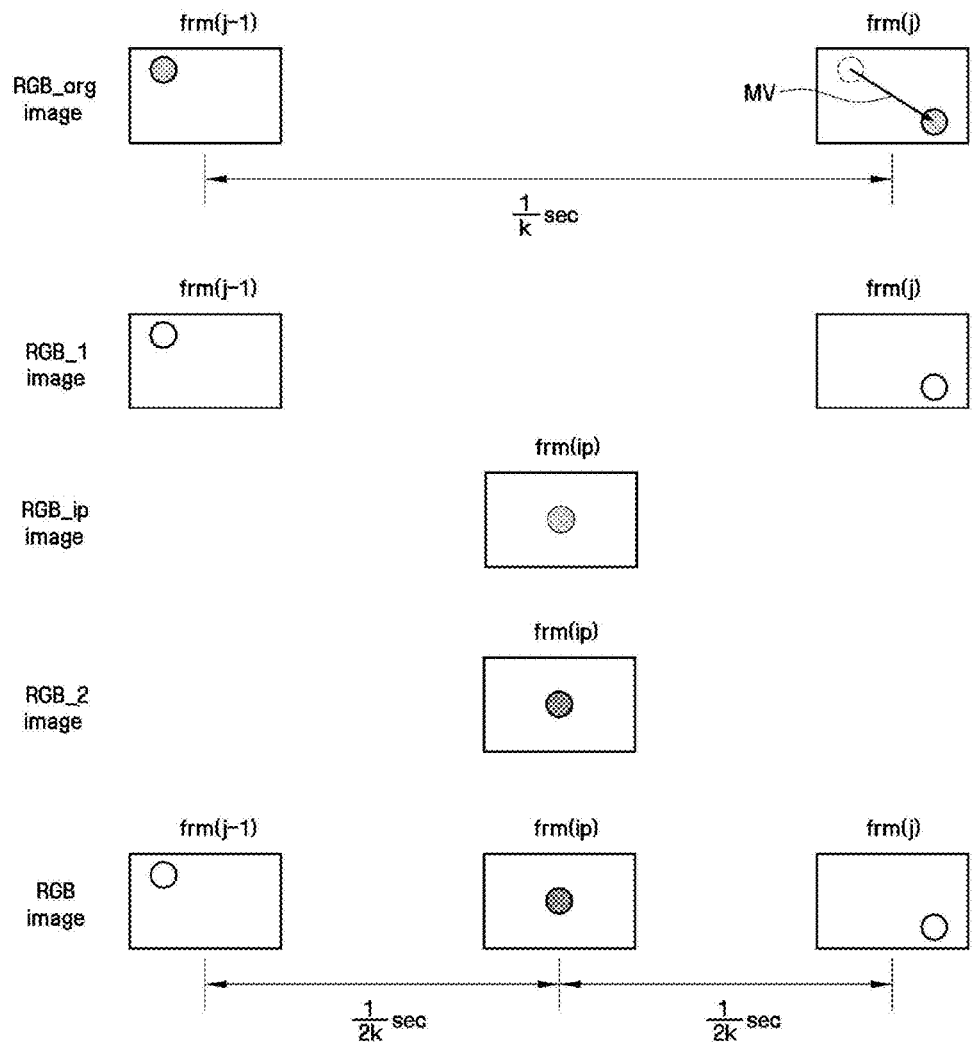
FIG. 6 illustrates images displayed in various frames and interpolation frames of the exemplary display device shown in FIG. 1.
Figure 7A:
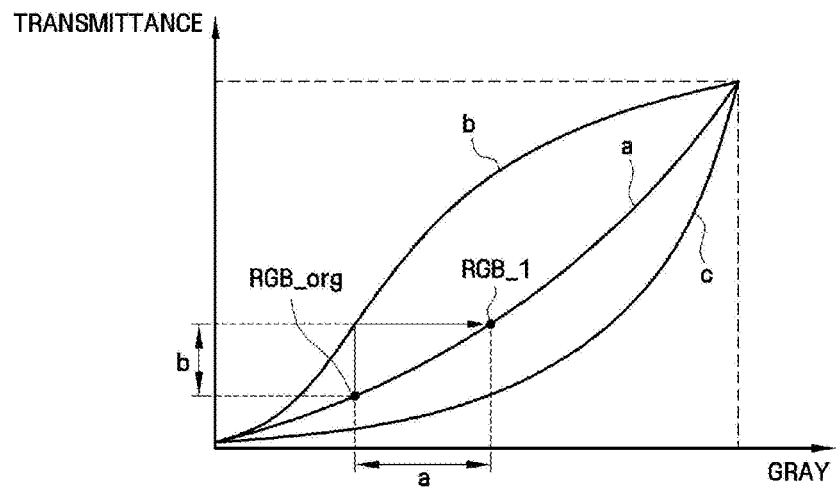
FIGS. 7A and 7B illustrate the operation of the exemplary image signal processor shown in FIG. 3.
Figure 7B:
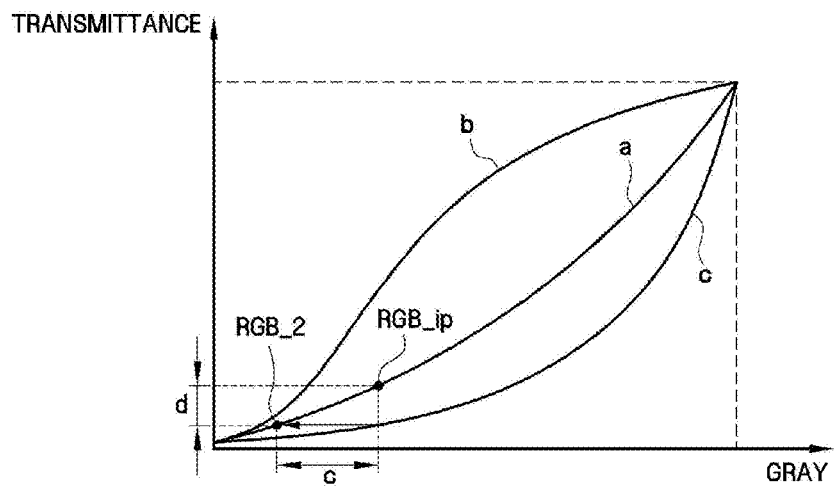
Figure 8:
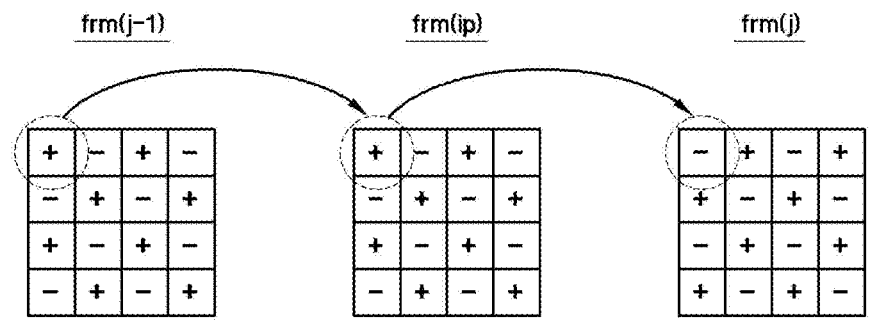
FIG. 8 illustrates polarities of data signals applied to various frames and interpolation frames of the exemplary display device shown in FIG. 1.

FIG. 6 illustrates images displayed in various frames and interpolation frames of the exemplary display device shown in FIG. 1. FIGS. 7A and 7B illustrate the operation of the exemplary image signal processor shown in FIG. 3. FIG. 8 illustrates polarities of data signals applied to various frames and interpolation frames in the exemplary display device shown in FIG. 1. Although FIG. 6 shows that one interpolation frame is inserted between two adjacent frames among various frames by way of example, but not limited thereto, two or more interpolation frames may be inserted between each of the various frames in another exemplary embodiment of the present invention.

First, images displayed in various frames and interpolation frames thereof of the display device shown in FIG. 1 will be described with reference to FIGS. 3, 4, 6 and 7A.

The display device 10 shown in FIG. 1 can display the image corresponding to each of the previous and current frames frm(j−1) and frm(j) using the first image signal RGB_1 obtained by correcting a level of the original image signal RGB_org for each of the frames frm(j−1) and frm(j). In detail, the first correction unit 620 of the image signal processor 602 of the signal controller 600 of the display device 10 is supplied with the original image signal RGB_org for each of the frames frm(j−1) and frm(j), and provides a corrected signal as the first image signal RGB_1 which has a higher level than the original image signal RGB_org by a predetermined level (e.g., a).

Accordingly, the display device 10 can display the image corresponding to the first gamma curve labeled 'b' corrected based on the original gamma curve labeled 'a' in each of the frames frm(j−1) and frm(j). For example, since transmittance of liquid crystal is increased, an image having higher brightness by a predetermined level (e.g., b) than an image corresponding to the original image signal RGB_org can be displayed in each of the previous and current frames frm(j−1) and frm(j).

Next, images displayed in the interpolation frame frm(ip) of the display device 10 shown in FIG. 1 will be described with reference to FIGS. 3 through 6, and FIG. 7B.

The display device 10 can display the image corresponding to the interpolation frame frm(ip) using the second image signal RGB_2 obtained by correcting a level of the interpolation signal RGB_ip for the interpolation frame frm(ip). Here, in an exemplary embodiment, at least one interpolation frame frm(ip) is inserted between a previous frame frm(j−1) and a current frame frm(j) among various frames, and in another exemplary embodiment of the present invention, two or more interpolation frames frm(ip) may be inserted between each of the various frames.

First, the image interpolator 630 of the image signal processor 602 of the signal controller 600 of the display device 10 generates the interpolation signal RGB_ip used to generate an image in the interpolation frame frm(ip) using original image signals RGB_org_frm(j−1) and RGB_org_frm(j) for the previous frame frm(j−1) and the current frame frm(j). In detail, the image interpolator 630 separates the original image signals RGB_org_frm(j−1) and RGB_org_frm(j) for the previous frame frm(j−1) and the current frame frm(j) into brightness components br(j−1) and br(j) and a chrominance component, respectively. The motion vector detector 633 calculates a motion vector MV of same object using the brightness components br(j−1) and br(j) and the chrominance component. The motion vector detector 633 identifies the same object displayed in areas where brightness distributions are closest to each other by analyzing the brightness component br(j−1) of the original image signal RGB_org_frm(j−1) for the previous frame frm(j−1) and the brightness component br(j) of the original image signal RGB_org_frm(j) for the current frame frm(j), and obtains the motion vector MV of the same object in the previous frame frm(j−1) and the current frame frm(j). Here, identifying the same object is performed by comparing the original image signal RGB_org_frm(j−1) for the previous frame frm(j−1) corresponding to each display block DB, with the original image signal RGB_org_frm(j) for the current frame frm(j). Next, the interpolated image generator 635 generates the interpolation signal RGB_ip based on the original image signal RGB_org_frm(j−1) for the previous frame frm(j−1) supplied from the frame memory using the motion vector MV supplied from the motion vector detector 633 and a predetermined weight α.

Next, the interpolation signal RGB_ip is supplied to the second correction unit 640 of the image signal processor 602 of the signal controller 600 of the display device 10, and a second image signal RGB_2 having a predetermined level, e.g., c, lower than the interpolation signal RGB_ip, is generated by the second correction unit 640. Accordingly, the display device 10 is supplied with the interpolation signal RGB_ip and displays an image corresponding to the second gamma curve labeled 'c' based on the original gamma curve labeled 'a.' For example, since transmittance of liquid crystal is reduced, the image displayed in each interpolation frame frm(ip) has brightness of a predetermined level (e.g., d) lower than that of the interpolation signal RGB_ip.

As described above, the display device 10 according to an exemplary embodiment of the present invention displays the image corresponding to the original image signal RGB_org in each of the previous and current frames frm(j−1) and frm(j) and the image corresponding to the interpolation signal RGB_ip that is additionally generated using the original image signal RGB_org in the interpolation frame frm(ip). Also, the original image signals RGB_org are supplied from the respective frames frm(j−1) and frm(j) so that images corresponding to the first gamma curve labeled 'b' corrected based on the original gamma curve labeled 'a' are displayed. Further, the interpolation signals RGB_ip are supplied from the interpolation frame frm(ip) so that images corresponding to the second gamma curve labeled 'c' corrected based on the original gamma curve labeled 'a' are displayed.

Accordingly, the display device 10 can sequentially display images corresponding to the first and second gamma curves labeled 'b' and 'c,' which are corrected based on the original gamma curve labeled 'a' for the original image signal RGB_org or the interpolation signal RGB_ip, thereby improving lateral visibility of the display device 10. In other words, the lateral visibility of the display device 10 can be improved by displaying both the images corresponding to the first and second gamma curves labeled 'b' and 'c' having relatively small and large gamma coefficients, respectively, and the images are temporally averaged. In this way, the display device 10 can display substantially the same image as the image corresponding to the original gamma curve labeled 'a.'

In addition, images are displayed using the image signal RGB having a higher frequency, for example, 2 k Hz, than the original image signal RGB_org, for example, 1 k Hz, and the image having relatively low brightness is displayed in the interpolation frame frm(ip) inserted between frames frm(j−1) and frm(j), which reduces a motion blur, thereby improving display quality. In detail, the display device 10 can display more image frames frm(j−1), frm(ip), and frm(j) than those contained in the original image signal RGB_org per second and the images displayed in the interpolation frame frm(ip) inserted between the frames frm(j−1) and frm(j) have relatively low brightness. Therefore, accumulated levels of light perceived by the human eye are reduced, thereby reducing the motion blur.

Further, in the display device 10 according to an exemplary embodiment of the present invention, the image displayed in each interpolation frame frm(ip) is an image corresponding to the second gamma curve labeled 'c' having a relatively small coefficient, and therefore display quality due to an error of an artifact image corresponding to the interpolation signal RGB_ip can be minimized. That is to say, since the image displayed in the interpolation frame frm(ip) has low brightness, display deterioration in the interpolation frame frm(ip) may not be perceived properly.

As shown in FIG. 8, in the display device 10 according to an exemplary embodiment of the present invention, a data signal applied to the display panel 300 has a first polarity (for example, a positive polarity) in the previous frame frm(j−1) and the interpolation frame frm(ip), where the interpolation frame frm(ip) is inserted between the frames frm(j−1) and frm(j). A data signal applied to the display panel 300 has a second polarity (for example, a negative polarity) in the current frame frm(j). In an exemplary embodiment, as shown in FIG. 8, polarity-reversed data signals are applied to two adjacent image frames, e.g., a current frame frm(j) and its interpolation frame frm(ip), thereby preventing deterioration of liquid crystal contained in the display panel 300 and avoiding deterioration of display quality due to generation of flickers. The current frame frm(j) may also have a reversed polarity with respect to the previous frame frm(j−1). In the illustrated embodiment, a polarity of the data signal applied to each unit pixel is opposite to that of the data signal applied to a next unit pixel ('dot inversion'), but not limited thereto. For example, in liquid crystal displays ("LCDs") according to other exemplary embodiments, a polarity of a data signal applied to each pixel is opposite to that of a data signal applied to each pixel in a previous frame ('frame inversion'), or a polarity of a data signal applied to each pixel is opposite to that of a data signal applied to each pixel depending on signal lines ('line inversion').

Figure 9:
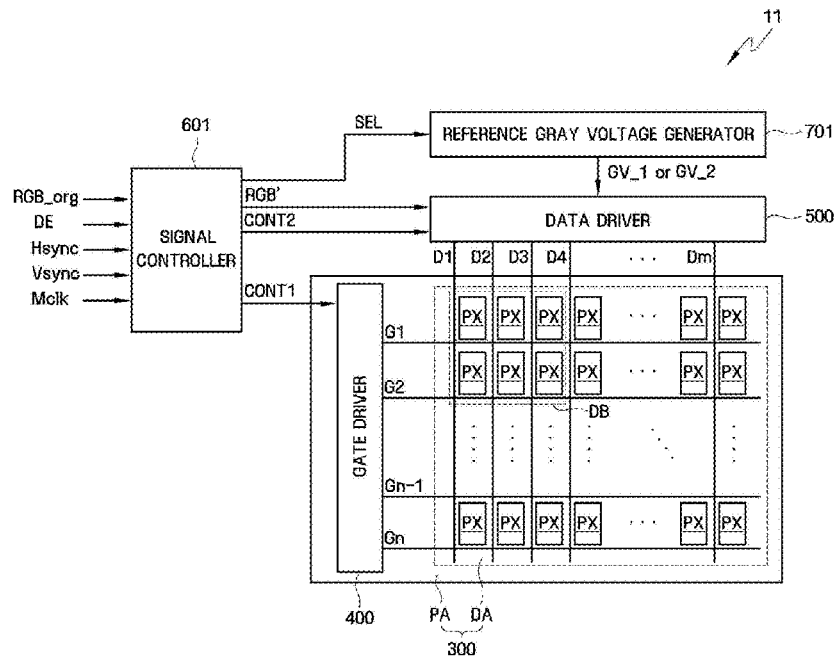
FIG. 9 is a block diagram of an exemplary display device according to another exemplary embodiment of the present invention.

Hereinafter, a display device according to another exemplary embodiment of the present invention will be described with reference to FIGS. 9 through 11. FIG. 9 is a block diagram of an exemplary display device according to another exemplary embodiment of the present invention, FIG. 10 is a block diagram of an exemplary image signal processor in the exemplary display device shown in FIG. 9, and FIG. 11 is a block diagram of an exemplary gamma voltage unit shown in FIG. 9.

Figure 10:
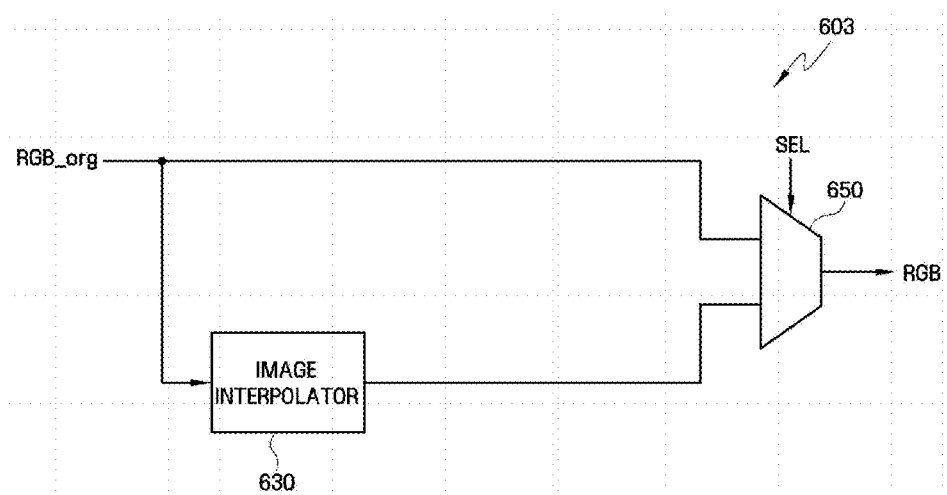
FIG. 10 is a block diagram of an exemplary image signal processor of the exemplary display device shown in FIG. 9.
Figure 11:
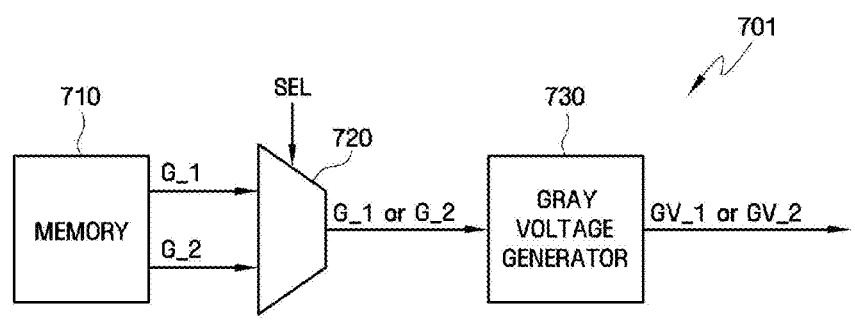
FIG. 11 is a block diagram of an exemplary gamma voltage unit shown in FIG. 9.

Referring to FIGS. 9 through 11, an image signal processor 603 of the signal controller 601 of the display device 11, unlike the display device 10, provides the data driver 500 with an uncorrected, original image signal RGB_org and an uncorrected interpolation signal RGB_ip. In addition, a reference gray voltage generator 701 of the display device 11, unlike the display device 10, selectively provides the data driver 500 with a first reference gray voltage GV_1 or a second reference gray voltage GV_2.

In detail, the image signal processor 603 of the display device 11 provides the data driver 500 with an image signal RGB containing the original image signal RGB_org and the interpolation signal RGB_ip, and includes an image interpolator 630 and a selector 650. In response to the selection signal SEL, the image signal processor 603 provides the data driver 500 with the original image signal RGB_org as an image signal RGB' in each of the frames frm(j−1) and frm(j), and provides the data driver 500 with the interpolation signal RGB_ip as an image signal RGB' in each interpolation frame frm(ip).

In response to the selection signal SEL, the reference gray voltage generator 701 provides the data driver 500 with the first reference gray voltage GV_1 or the second reference gray voltage GV_2. In detail, the reference gray voltage generator 701 provides the data driver 500 with the first reference gray voltage GV_1 corresponding to a first gamma curve (for example, a curve labeled 'b' shown in FIG. 13A) in the respective frames frm(j−1) and frm(j), and provides the data driver 500 with the second reference gray voltage GV_2 corresponding to a second gamma curve (for example, a curve labeled 'c' shown in FIG. 13A) in each interpolation frame frm(ip).

In an exemplary embodiment, as shown in FIG. 11, the reference gray voltage generator 701 may include a memory 710, a selector 720 and a gray voltage generator 730. The memory 710 may store a first look-up table derived from the first gamma curve and a second look-up table derived from the second gamma curve.

The selector 720 may output first conversion data G_1 corresponding to the first look-up table or second conversion data G_2 corresponding to the second look-up table in response to the selection signal SEL. In detail, in response to the selection signal SEL, the selector 720 may provide the reference gray voltage generator 730 with the first conversion data G_1 in the respective frames frm(j−1) and frm(j) and may provide the reference gray voltage generator 730 with the second conversion data G_2 in each interpolation frame frm(ip). That is to say, the selector 720 may provide the reference gray voltage generator 730 with the first conversion data G_1 or the second conversion data G_2 as the image signal processor 603 selectively provides the data driver 500 with the original image signal RGB_org or the interpolation signal RGB_ip.

The reference gray voltage generator 701 generates the first reference gray voltage GV_1 or the second reference gray voltage GV_2 using the first conversion data G_1 or the second conversion data G_2, and provides the same to the data driver 500. Here, the first reference gray voltage GV_1 may include a plurality of voltages having different levels used to represent images corresponding to the first gamma curve, and the second reference gray voltage GV_2 may include a plurality of voltages having different levels used to represent images corresponding to the second gamma curve.

The data driver 500 provides the first data signal corresponding to each of the frames frm(j−1) and frm(j) using the original image signal RGB_org and the first reference gray voltage GV_1. In addition, the data driver 500 provides the second data signal for each interpolation frame frm(ip) using the interpolation signal RGB_ip and the second reference gray voltage GV_2. Here, if levels of the original image signal RGB_org and the interpolation signal RGB_ip are the same as each other, the first data signal generated using the first reference gray voltage GV_1 may have a higher level than that of the second data signal generated using the second reference gray voltage GV_2.

Figure 13A:
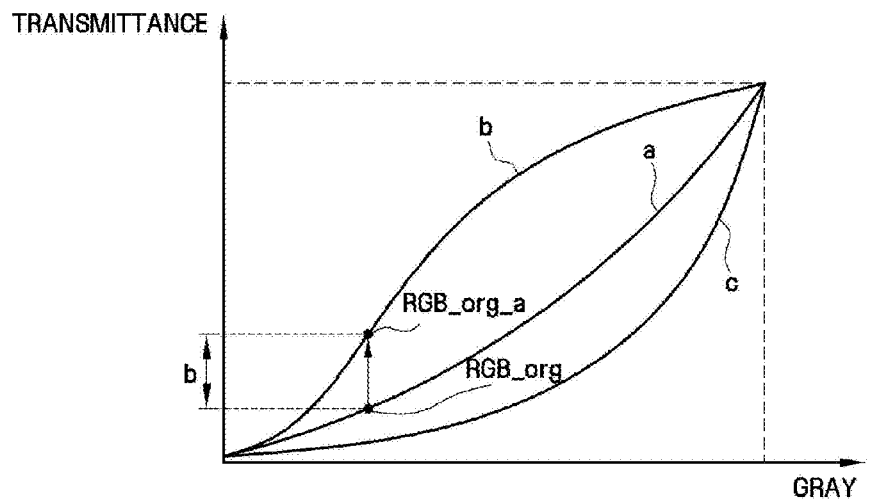
FIGS. 13A and 13B illustrate the operation of the exemplary image signal processor shown in FIG. 9.

Accordingly, the display device 10 can display the image corresponding to the original image signal RGB_org based on the first gamma curve labeled 'b' shown in FIG. 13A, using the original image signal RGB_org and the first reference gray voltage GV_1 in each of the frames frm(j−1) and frm(j), and can display the image corresponding to the interpolation signal RGB_ip based on the second gamma curve labeled 'c' using the interpolation signal RGB_ip and the second reference gray voltage GV_2 in each interpolation frame frm(ip).

Figure 12:
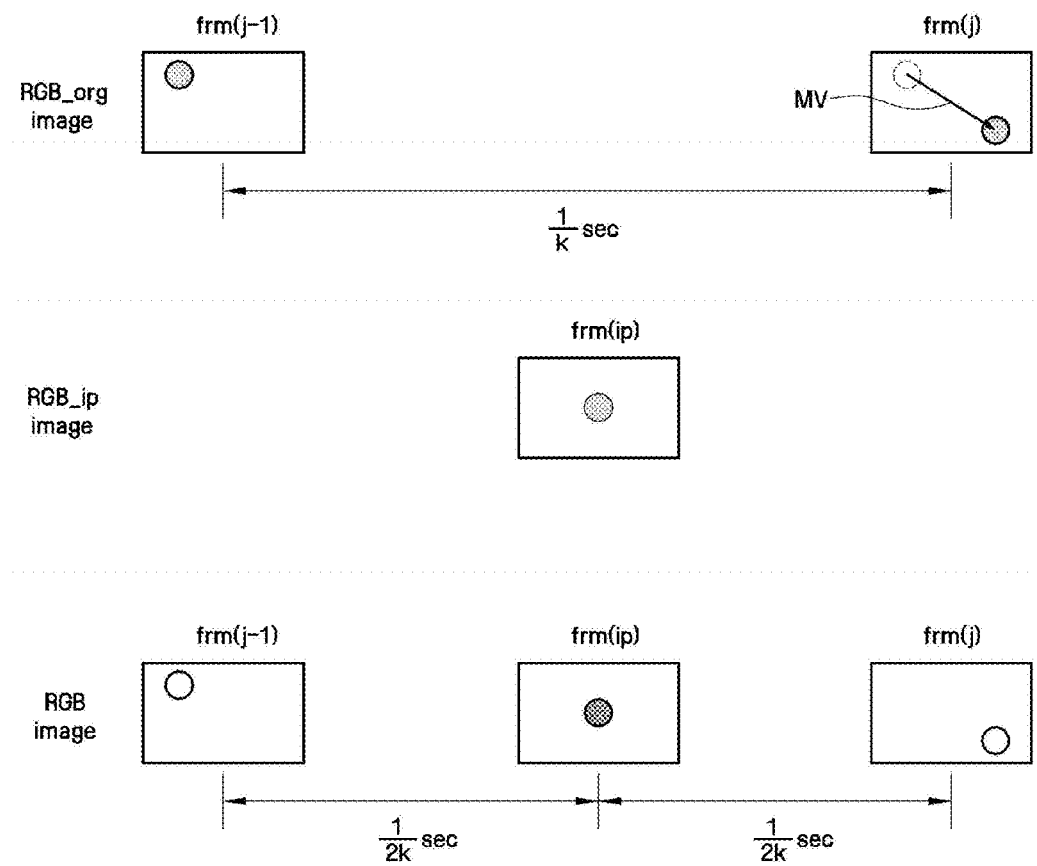
FIG. 12 illustrates images displayed in various frames and interpolation frames of the exemplary display device shown in FIG. 9.
Figure 13B:
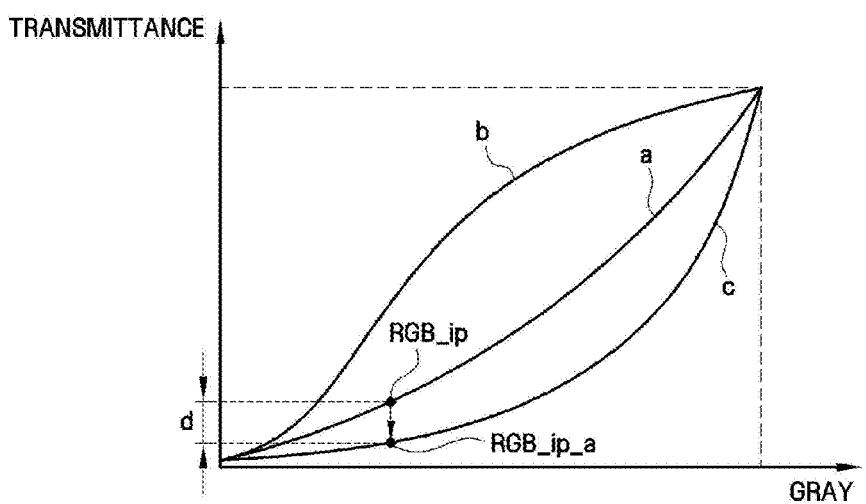

Hereinafter, an exemplary driving method of the exemplary display device according to another exemplary embodiment of the present invention will be described with reference to FIGS. 9 through 13B. FIG. 12 illustrates images displayed in various frames and interpolation frames in the exemplary display device shown in FIG. 9, and FIGS. 13A and 13B illustrate the operation of the exemplary image signal processor shown in FIG. 10.

First, images displayed in the respective frames frm(j−1) and frm(j) of the display device 11 shown in FIG. 9 will be described.

The display device 11 according to another exemplary embodiment of the present invention can display images corresponding to the respective frames frm(j−1) and frm(j) using an image signal RGB_org and a first reference gray voltage GV_1 for the respective frames frm(j−1) and frm(j). That is to say, the display device 11 is supplied with the original image signal RGB_org in each of the frames frm(j−1) and frm(j) and displays an image corresponding to the first gamma curve labeled 'b' corrected based on the original gamma curve labeled 'a.' Accordingly, since transmittance of liquid crystal is increased, the images displayed in the respective frames frm(j−1) and frm(j) have higher brightness by a predetermined level, e.g., b, than the image corresponding to the original image signal RGB_org.

Next, images displayed in the interpolation frame frm(ip) of the display device 11 shown in FIG. 9 will be described.

The display device 11 can display the image corresponding to the interpolation frame frm(ip) using the interpolation signal RGB_ip and the second reference gray voltage GV_2 for the interpolation frame frm(ip). That is to say, the display device 11 is supplied with the interpolation signal RGB_ip from the interpolation frame frm(ip), and displays the image corresponding to the second gamma curve labeled 'c' corrected based on the original gamma curve labeled 'a.' Accordingly, since transmittance of liquid crystal is reduced, the image displayed in the interpolation frame frm(ip) may have lower brightness by a predetermined level, e.g., d, than the image corresponding to the interpolation signal RGB_ip.

That is to say, the display device 11 according to another exemplary embodiment of the present invention is supplied with the original image signal RGB_org from each of the frames frm(j−1) and frm(j), and displays the image corresponding to the first gamma curve labeled 'b' corrected based on the original gamma curve labeled 'a.' In addition, the display device 11 is supplied with the interpolation signal RGB_ip from the interpolation frame frm(ip), and displays the image corresponding to the second gamma curve labeled 'c' corrected based on the original gamma curve labeled 'a.' Accordingly, the display device 11 according to another exemplary embodiment of the present invention can improve visibility and reduce a motion blur. In addition, display deterioration due to an artifact image can be reduced, which has been fully described above and the detailed description thereof is omitted.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A display device comprising:
   an image signal processor that is supplied with original image signals for various frames and generates interpolation signals used to display images corresponding to interpolation frames; and
   a display panel that displays images corresponding to the respective various frames and images corresponding to the respective interpolation frames,
   wherein the images displayed in the respective various frames are images corresponding to a first gamma curve corrected based on an original gamma curve, the images displayed in the respective interpolation frames are images corresponding to a second gamma curve corrected based on the original gamma curve, and the first gamma curve is different from the second gamma curve; and
   wherein the image signal processor comprises:
      a first correction unit that is supplied with the original image signals and provides a first image signal obtained by correcting levels of the original image signals;
      an image interpolator that generates the interpolation signals using the original image signals, which correspond to a previous frame and a current frame, respectively; and
      a second correction unit that is supplied with the interpolation signals and provides a second image signal obtained by correcting levels of the interpolation signals.

2. The display device of claim 1, wherein an original image corresponding to the original image signals is an image corresponding to the original gamma curve, the first gamma curve has a gamma coefficient higher than that of the original gamma curve, and the second gamma curve has a gamma coefficient lower than that of the original gamma curve.

3. The display device of claim 1, wherein the first image signal is a signal corrected so as to have a higher level than the original image signals, and the second image signal is a signal corrected so as to have a lower level than the interpolation signals.

4. The display device of claim 1, wherein the image signal processor further comprises a selector that selectively outputs the first image signal or the second image signal.

5. The display device of claim 1, further comprising:
   a reference gray voltage generator that generates a first reference gray voltage or a second reference gray voltage; and
   a data driver that provides a first data signal for the respective various frames based on the original image signals and the first reference gray voltage, and a second data signal for the interpolation frames based on the interpolation signals and the second reference gray voltage.

6. The display device of claim 5, wherein, when the levels of the original image signals and the interpolation signals are the same as each other, a level of the first data signal is higher than that of the second data signal.

7. The display device of claim 5, wherein the reference gray voltage generator comprises:
   a memory that stores a first look-up table derived from the first gamma curve and a second look-up table derived from the second gamma curve;
   a data selector that selectively provides first conversion data corresponding to the first look-up table or second conversion data corresponding to the second look-up table; and
   a gray voltage generator that generates in response to a selection signal the first reference gray voltage or the second reference gray voltage using the first conversion data or the second conversion data.

8. The display device of claim 7, wherein the image signal processor further comprises a selector that selectively outputs the original image signals or the interpolation signals in response to the selection signal, and the data selector of the reference gray voltage generator selectively outputs the first conversion data or the second conversion data in response to the selection signal.

9. The display device of claim 1, wherein the image interpolator calculates motion vectors of a same object by comparing a brightness component of an original image signal for the previous frame with a brightness component of an original image signal for the current frame, and generates the interpolation signals by assigning a weight value to the motion vectors.

10. The display device of claim 9, wherein the display panel comprises a plurality of display blocks, each of the plurality of display blocks including a plurality of pixels arranged in a matrix type, and the image interpolator identifies the same object by comparing the original image signal for the previous frame corresponding to each of the plurality of display blocks with the original image signal for the current frame.

11. The display device of claim 1, wherein at least two interpolation frames are inserted between the previous frame and the current frame adjacent to the previous frame.

12. The display device of claim 1, wherein a data signal applied to the display panel has a first polarity in an interpolation frame amongst the interpolation frames and the previous frame amongst the various frames, the interpolation frame inserted between the previous frame and the current frame adjacent to the previous frame amongst the various frames, while the data signal applied to the display panel has a second polarity in the current frame, the second polarity being different from the first polarity.

13. The display device of claim 1, wherein a brightness/chrominance separator is supplied with an original image signal of the current frame and an original image signal of the previous frame, and separates the respective original image signals into brightness components and chrominance components.

14. A display device comprising:
   an image signal processor that is supplied with original image signals for various frames and outputs a first image signal for the respective frames and a second image signal for an interpolation frame inserted between a previous frame and a current frame among the respective frames;
   a data driver that provides a data signal based on the first image signal or the second image signal; and
   a display panel that displays an image in response to the data signal, wherein the first image signal is a signal obtained by correcting levels of the original image signals and the second image signal is a signal obtained by correcting a level of an interpolation signal generated using the original image signals for the previous frame and the current frame, and wherein the image signal processor comprises:
- a first correction unit that is supplied with the original image signals and provides the first image signal obtained by correcting levels of the original image signals;
- an image interpolator that generates the interpolation signal using the original image signals for the previous frame and the current frame; and
- a second correction unit that is supplied with the interpolation signal and provides the second image signal obtained by correcting a level of the interpolation signal.

15. The display device of claim 14, wherein the image signal processor further comprises:
a selector that selectively outputs the first image signal or the second image signal.

16. The display device of claim 15, wherein the first image signal is a signal corrected so as to have a higher level than the original image signals, and the second image signal is a signal corrected so as to have a lower level than the interpolation signal.

17. The display device of claim 14, wherein a brightness/chrominance separator is supplied with an original image signal of the current frame and an original image signal of the previous frame, and separates the respective original image signals into brightness components and chrominance components.

18. A method of driving a display device, the method comprising:
- receiving original image signals for various frames and generating an interpolation signal used to display images corresponding to interpolation frames;
- displaying images corresponding to a first gamma curve corrected based on an original gamma curve in the respective various frames; and
- displaying images corresponding to a second gamma curve corrected based on the original gamma curve in the interpolation frames, wherein the image signal processor comprises:
- a first correction unit that is supplied with the original image signals and provides the first image signal obtained by correcting levels of the original image signals;
- an image interpolator that generates the interpolation signal using the original image signals for the previous frame and the current frame; and
- a second correction unit that is supplied with the interpolation signal and provides the second image signal obtained by correcting a level of the interpolation signal.

19. The method of claim 18, wherein the first gamma curve has a larger gamma coefficient than the original gamma curve, and the second gamma curve has a smaller gamma coefficient than the original gamma curve.

20. The method of claim 18, wherein displaying the images corresponding to the first gamma curve comprises providing the first image signal obtained by correcting the levels of the original image signals, and displaying the images corresponding to the second gamma curve comprises providing the second image signal obtained by correcting the levels of the interpolation image.

21. The method of claim 18, further comprising selectively providing a first reference gray voltage or a second reference gray voltage, wherein displaying the images corresponding to the first gamma curve comprises providing a first data signal for the respective various frames based on the first reference gray voltage and the original image signals, and displaying the images corresponding to the second gamma curve comprises providing a second data signal based on the second reference gray voltage and the interpolation signal.

22. The method of claim 18, wherein a brightness/chrominance separator is supplied with an original image signal of the current frame and an original image signal of the previous frame, and separates the respective original image signals into brightness components and chrominance components.

* * * * *